United States Patent [19]
Gwilliam

[11] 3,713,382
[45] Jan. 30, 1973

[54] TUBE PRESSURE FILTERS
[75] Inventor: Ralph Derek Gwilliam, Cornwall, England
[73] Assignee: New English Clays Lovering Pochin & Company Limited, Cornwall, England
[22] Filed: Feb. 1, 1971
[21] Appl. No.: 111,482

[30] Foreign Application Priority Data
Feb. 11, 1970  Great Britain......................6,695/70
July 21, 1970  Great Britain.....................35,374/70

[52] U.S. Cl. ..................100/112, 100/211, 210/350
[51] Int. Cl...............................B30b 9/06, B30b 5/02
[58] Field of Search......100/110, 112, 114, 122, 115, 100/123, 211, 297, 298, 37; 210/178, 229, 225, 350

[56] References Cited

FOREIGN PATENTS OR APPLICATIONS

| 244,142 | 4/1963 | Austria..................................100/211 |
| 1,155,760 | 10/1963 | Germany..............................100/211 |
| 279,632 | 1930 | Italy......................................100/211 |

*Primary Examiner*—Peter Feldman
*Attorney*—Larson, Taylor and Hinds

[57] ABSTRACT

The sealing of the inner compartment of a tube pressure filter, which comprises a pair of co-axial tubular bodies displaceable relative to one another and forming between them an annular chamber which is effectively divided by an impermeable elastic sleeve secured to the outer tubular body into inner and outer compartments, is effected at least in part by the impermeable elastic sleeve.

8 Claims, 4 Drawing Figures

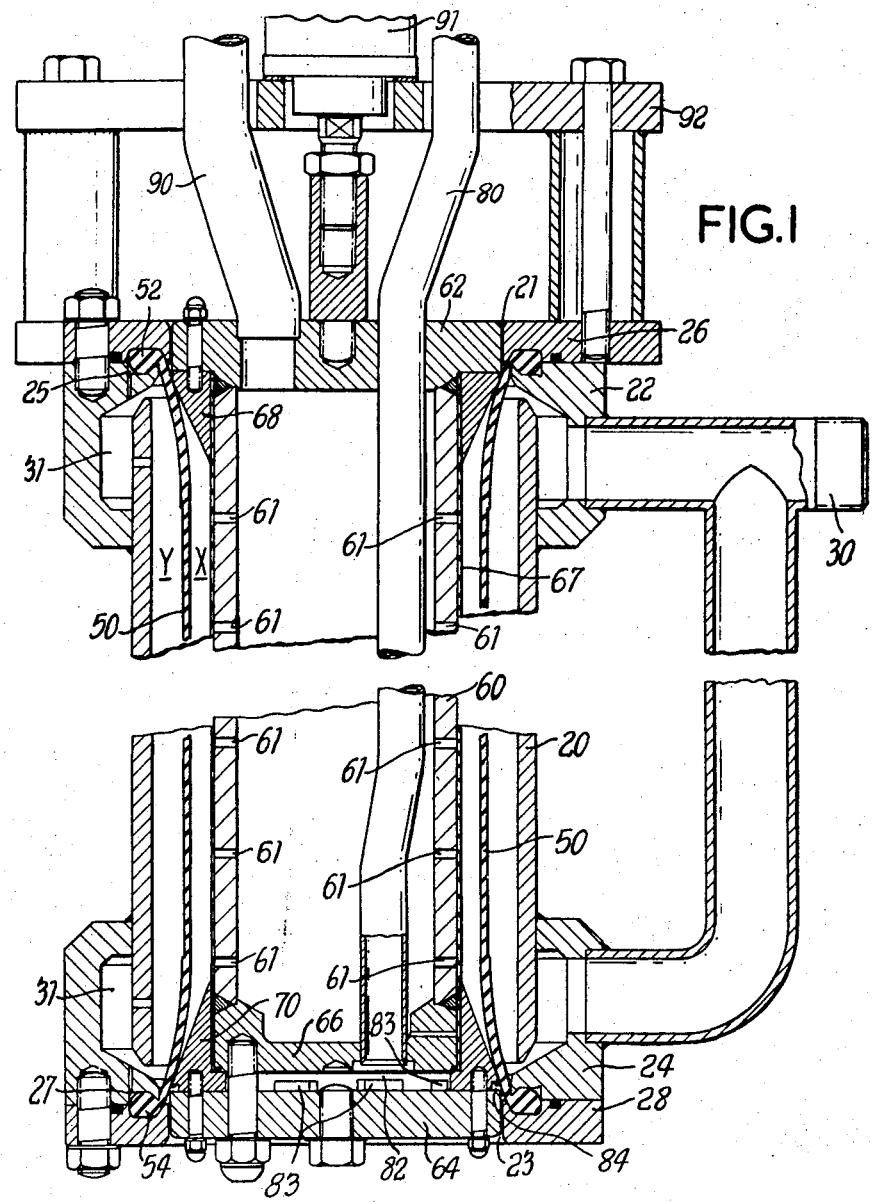

TUBE PRESSURE FILTERS

BACKGROUND OF THE INVENTION

This invention relates to apparatus for reducing the liquid content of wet, particulate solid materials.

It has been well known for many years to reduce the liquid content of wet, particulate solid materials, for example in the form of a slurry, by means of plate filter presses. When treating solid materials, such as clays and chalks, which contain a relatively high percentage, say more than 20 percent, of particles smaller than 20 microns, it is necessary to employ high pressures to produce a filter cake of low moisture content. However, serious engineering problems arise with conventional plate filter presses when it is desired to operate at very high pressures, for example in excess of 1,000 p.s.i. Consequently, in recent years there have been developed what are known as tube pressure filters which are capable of operating at such high pressures. Various kinds of tube pressure filters have been described; see, for example, U.K. Pat. No. 907,485 and my U.S. application Ser. No. 871,467, filed Oct. 23, 1969, now abandoned in favor of streamline continuation application Ser. No. 134,507, filed Apr. 15, 1971. One kind of tube pressure filter essentially comprises a pair of generally coaxial tubular bodies forming between them an annular chamber; means for displacing the tubular bodies axially relative to one another between a first position and a second position; and an impermeable elastic sleeve which is secured to the outer of the pair of tubular bodies and divides said chamber into generally coaxial and non-communicating inner and outer compartments; wherein the tubular bodies are provided with means for sealing the inner compartment when the tubular bodies are in the first position, wherein the inner compartment includes an inlet at the lower end thereof, for a wet particulate solid material to be pressure filtered, and a filter element which is supported by the inner of the pair of tubular bodies, said inlet means being constructed such that when the tubular bodies are supported in a generally upright position, a wet particulate solid material to be pressure filtered can be charged to the bottom of the inner compartment through the inlet and directed and distributed substantially uniformly around the lower end of the inner compartment to enable scouring of at least the lower portion of the filter element, the inner tubular body and the filter element being constructed and arranged so that in the first position of said tubular bodies said inner compartment is sealed and liquid can flow through the filter element and the inner tubular body while particulate solid material is retained on the filter element, wherein the outer compartment includes an inlet for a hydraulic fluid under pressure whereby in the first position of said tubular bodies the impermeable elastic sleeve can be urged against a wet particulate solid material in the inner compartment to compress the same and to remove liquid therefrom, and wherein in the second position of said tubular bodies the inner compartment is opened and the particulate solid material can be discharged from the inner compartment. Hereinafter this kind of pressure filter will be referred to as "a tube pressure filter of the kind set forth." With the known tube pressure filters of the kind set forth, which include the tube pressure filters described in my said U.S. application Ser. No. 134,507, the sealing of the inner compartment, when the tubular bodies are in their first position, has been achieved by providing ring seals in the end sections of one of the tubular bodies, which ring seals can co-operate with the adjacent end sections of the other tubular body.

It is found that with very high operating pressures the life of such a ring seal is not as long as is desirable, and it is an object of the present invention to provide a tube pressure filter of the kind set forth which has a more efficient means of sealing the inner compartment of the tube pressure filter.

SUMMARY OF THE INVENTION

In accordance with the present invention there is provided a tube pressure filter of the kind set forth wherein the means for sealing the inner compartment comprises, at each end of the inner compartment, an end of the impermeable elastic sleeve which is secured to the outer tubular body in a recess formed in the end section of the outer tubular body, the arrangement being such that, when the outer and inner compartments of the tube pressure filter contain, respectively, a hydraulic fluid under pressure and a wet particulate solid material to be pressure filtered, the impermeable elastic sleeve is urged inwards by the hydraulic fluid against the surface of the adjacent end section of the inner tubular body to form a seal therewith.

DESCRIPTION OF THE PREFERRED EMBODIMENTS

Figure 4:
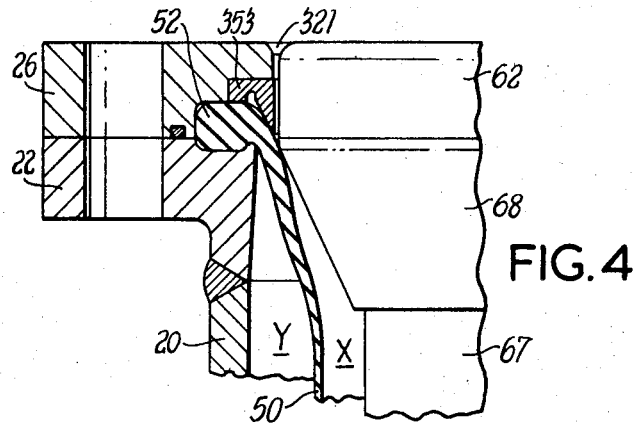

Advantageously, each end of the impermeable elastic sleeve is located in a recess which also contains a flexible annular member, generally a ring seal, and co-operates with the latter and with the surface of the adjacent end section of the inner tubular body to form the desired seal. Preferably, such a ring seal is a cup-ring seal or a U-ring seal and the end of the impermeable elastic sleeve is located substantially within the ring seal. At least that portion of the ring seal which bears against the surface of the end section of the inner tubular body should be sufficiently flexible to yield under the action of pressure. The ring seal can be manufactured from, for example, leather, a rubber reinforced with a fibrous or woven material, a polyurethane, e.g. ADIPRENE, a polypropylene, a polyacetal or a polytetrafluoroethylene, e.g. VITON. More generally, the ring seal can be made from an engineering plastics material having a tangent modulus of elasticity in the range of from 0.5 to $6.0 \times 10^5$ p.s.i. (A.S.T.M. D – 790 66) and an apparent creep modulus, measured at 73°F over 100 hours and with an initial pressure of 1,000 p.s.i., greater than $4 \times 10^4$ p.s.i., for example a polypropylene or a polyacetal. VITON has a tensile strength of $2,250 \pm 10\%$ lbf/in$^2$, an elongation at break point of 390%, and a shore hardness of 70 to 80; and ADIPRENE has a tensile strength of $5,000 \pm 10\%$ lbf/in$^2$, an elongation at break point of 450 percent, and a shore hardness of 85 to 95.

When no flexible annular member, such as a ring seal, is used it will generally be necessary to construct the tubular bodies so that in their first position there is a gap, which is in the range of from 0.002 to 0.005 inches, between adjacent end sections of the tubular bodies.

The present invention is especially suitable for incorporation in a tube pressure filter as described in my said U.S. application Ser. No. 134,507. Such a tube pressure filter comprises:

a. a chamber of annular cross-section substantially defined by two tubular bodies which are capable of withstanding high pressures, are arranged substantially coaxially one within the other and are displaceable axially relative to one another between a first operative position and a second inoperative position, the outer tubular body being provided with an inlet for the introduction thereinto of hydraulic fluid and the inner tubular body being provided with a plurality of apertures for the passage therethrough of filtrate;

b. sealing means which co-operate to form a seal between the adjacent ends of the two tubular bodies when the pressure filter is in the operative position;

c. a filter element supported by and extending around the external wall of the inner tubular body, the filter element being arranged so as to prevent the passage through the apertures in said inner tubular body of particulate solid material being pressure filtered;

d. an impermeable elastic sleeve disposed in said chamber of annular cross-section and secured in liquid-tight manner to the ends of the outer tubular body so as to divide said chamber into non-communicating outer and inner compartments of annular cross-section, said outer compartment of annular cross-section being effectively defined by the impermeable elastic sleeve and the internal wall of the outer tubular body and said inner compartment of annular cross-section being effectively defined by the impermeable elastic sleeve and the external wall of the inner tubular body;

e. means for introducing a wet, particulate solid material to be pressure filtered under pressure into an inlet located at the bottom of said second compartment of annular cross-section in a manner such that said wet, particulate solid material is charged through said inlet to the bottom of said inner compartment and distributed and directed substantially uniformly around the second compartment so as to enable scouring of at least the lower portion of the filter element;

f. means for removing filtrate from the interior of the inner tubular body;

g. means for displacing the tubular bodies axially relative to one another from the operative position to the inoperative position after a pressure filtering operation; and h. means for removing the particulate solid material from the surface of the filter element after the filtrate has been removed from the solid material and the inner and outer tubular bodies have been axially displaced relative to one another to the inoperative position.

Figure 3:
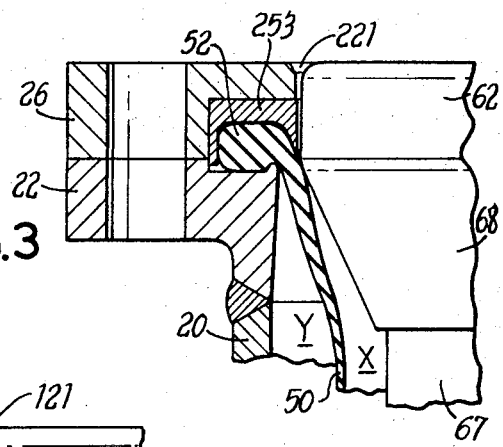
Figure 2:
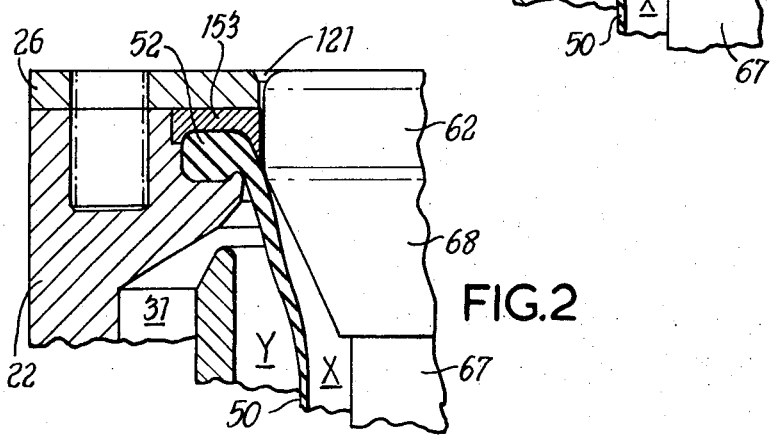

For a better understanding of the invention and to show how the same may be carried into effect reference will now be made, by way of example, to the accompanying drawings in which:

FIG. 1 shows a longitudinal section through one embodiment of a tube pressure filter according to the invention; and FIGS. 2, 3 and 4 show a part of three further embodiments of tube pressure filters according to the invention.

In FIG. 1 of the accompanying drawings there is shown, in longitudinal section, a tube pressure filter which is constructed substantially as described in my said U.S. application Ser. No. 134,507 except that the sealing means which co-operate to form a seal between the adjacent ends of the two tubular bodies when the pressure filter is in the operative position has been modified in accordance with the present invention.

The inner tubular body comprises a steel central section 60 to which is welded an upper cap 62 and an inner lower cap 66. An outer lower cap 64 is bolted to the inner lower cap and supports an annular fairing 70. The inner tubular body is provided with a number of apertures 61 and supports a filter element 67. A similar annular fairing 68 is bolted to the upper cap 22. The outer tubular body, which supports a framework 92, comprises a central cylindrical steel section 20. To the upper end of the central cylindrical steel section 20 there is welded an upper flange portion 22, and an upper annular member 26 is bolted to the flange portion 22. The shape of the flange portion 22 and of the upper annular member 26 are such that there is formed between them a recess 25 which is of a size sufficient to accommodate the annular beading 52 of the upper end of an impermeable rubber sleeve 50. In operation, the rubber sleeve 50 is urged inwards by the hydraulic fluid under pressure to seal the small gaps 21 and 23 formed between adjacent ends of the tubular bodies. In a similar manner, there is welded to the lower end of the cylindrical steel section 20 a lower flange portion 24. A lower annular member 28 is bolted to the lower flange portion 24, and a recess 27 is formed between these two members. An annular beading 54 formed at the lower end of the impermeable rubber sleeve 50 is located in recess 27. The flange portions 22 and 24 each define an annular inlet 31 which communicates with the outer compartment Y through an annular slot formed between each end of the cylinder 20 and its adjacent flange portion 22 or 24 and with a pipe 30 which can be connected to a source of hydraulic fluid under pressure.

A material to be pressure filtered is introduced into the inner compartment X via a conduit 80, a chamber 82 which is formed between lower caps 64 and 66, and through ducts 83 with a channel 84. The inner tubular body can be displaced relative to the outer tubular body by means of a jack 91, and blasts of air to dislodge filter cake from the filter element 67, can be introduced into the inner tubular body by a conduit 90. Filtrate which passes through the apertures 61 can be removed by means of a siphon tube (not shown).

Referring next to FIG. 2, there is shown, partly in section, a portion of a tube pressure filter incorporating another embodiment of the sealing means of the present invention. In this embodiment, the sealing means comprises a flexible annular member, in the form of a ring seal 153, which together with annular beading 52 is located in a recess formed between the upper annular member 26 and the upper flange portion 22. In operation, both the flexible annular member 153 and the rubber sleeve 50 are urged inwards by the hydraulic fluid and co-operate with the upper cap 62 and fairing 68 of the inner tubular body to seal the inner compartment.

Referring next to FIG. 3, there is shown, again partly in section, a portion of a further embodiment of a tube pressure filter according to the invention. The construction of this embodiment is similar to that of the embodiment shown in FIG. 2 except that the hydraulic fluid is introduced into the outer compartment Y by means of circular ports located in the central cylindrical section 20 of the outer tubular body. The annular beading 52 is located substantially within the cup ring seal 253. In operation, the cup ring seal 253 and the rubber sleeve 50 are urged radially inwards against the upper cap 62 and fairing 68 to form a seal over the gap 221.

A further embodiment of the invention is shown in FIG. 4 where the flexible annular member 353 takes the form of a ring seal with a V-shaped notch formed therein to assist its deformation when hydraulic fluid is introduced under pressure into the outer compartment Y. A suitable ring seal can be manufactured from linen-reinforced rubber.

I claim:

1. A tube pressure filter which essentially comprises: (a) a pair of generally coaxial tubular bodies arranged one within the other, and adapted to be supported in a generally upright position, (b) an impermeable elastic sleeve disposed within and secured to the outer tubular body, (c) a filter element disposed around and supported by the inner tubular body, (d) means for displacing the tubular bodies axially relative to one another between first and second positions, wherein the arrangement is such that in the first position of said tubular bodies they cooperate with each other to define a closed annular chamber which is divided into generally coaxial and non-intercommunicating inner and outer compartments by said impermeable elastic sleeve, and in the second position of said tubular bodies said annular chamber is open to enable particulate solid material to be discharged from the inner compartment, wherein the outer compartment has an inlet for a hydraulic fluid under pressure, wherein the inner compartment is provided with an inlet means for receiving a wet, particulate solid material, said inlet means being disposed at the lower end of the inner compartment and constructed such that, when the tubular bodies are supported in a generally upright position and in their first position, a wet particulate solid material to be pressure filtered can be charged to the bottom of said inner compartment through said inlet means, and wherein the tube pressure filter includes means for distributing and directing the wet particulate solid material substantially uniformly around the lower end of the inner compartment to enable scouring of at least the lower portion of the filter element, and (e) a means for sealing the inner compartment, at each end of the inner compartment, said means for sealing the inner compartment being formed at least in part from a flexible annular member and an end of the impermeable elastic sleeve by securing the flexible annular member and the end of the impermeable elastic sleeve in a recess formed in the end section of the outer tubular body such that when the outer and inner compartments of the tubular pressure filter contain, respectively, a hydraulic fluid under pressure and a wet particulate solid material to be pressure filtered, the impermeable elastic sleeve is urged inwards by the hydraulic fluid against the surface of the adjacent end section of the inner tubular body to form a seal therewith.

2. A tube pressure filter as claimed in claim 1, wherein said flexible annular member is a cup-ring seal or a U-ring seal and wherein the end of said impermeable elastic sleeve is located substantially within said cup-ring or U-ring seal.

3. A tube pressure filter as claimed in claim 2, wherein said cup-ring or U-ring seal is made from a polyurethane, a polypropylene, a polyacetal or a polytetrafluoroethylene, having a tangent modulus of elasticity in the range 0.5 to $6.0 \times 10^5$ p.s.i. and an apparent creep modulus, measured at 73°F over 100 hours and with an initial pressure of 1,000 p.s.i., greater than $4 \times 10^4$ p.s.i.

4. A tube pressure filter which essentially comprises: (a) a pair of generally coaxial tubular bodies arranged one within the other, and adapted to be supported in a generally upright position, (b) an impermeable elastic sleeve disposed within and secured to the outer tubular body, (c) a filter element disposed around and supported by the inner tubular body, and (d) means for displacing the tubular bodies axially relative to one another between first and second positions, wherein the arrangement is such that in the first position of said tubular bodies they cooperate with each other to define a closed annular chamber which is divided into generally coaxial and non-intercommunicating inner and outer compartments by said impermeable elastic sleeve, and in the second position of said tubular bodies said annular chamber is open to enable particulate solid material to be discharged from the inner compartment, wherein the outer compartment has an inlet for a hydraulic fluid under pressure, wherein the inner compartment is provided with an inlet means for receiving a wet, particulate solid material, said inlet means being disposed at the lower end of the inner compartment and constructed such that, when the tubular bodies are supported in a generally upright position and in their first position, a wet particulate solid material to be pressure filtered can be charged to the bottom of said inner compartment through said inlet means, wherein the tube pressure filter includes means for distributing and directing the wet particulate solid material substantially uniformly around the lower end of the inner compartment to enable scouring of at least the lower portion of the filter element, wherein the inner tubular body comprises a central cylindrical section, and upper and lower end sections, each of which end sections includes a cap which is of larger external diameter than said central cylindrical section and an annular fairing adjacent said cap and conically tapered in towards said central cylindrical section, wherein the tube pressure filter includes a means for sealing the inner compartment, at each end of the inner compartment, the means for sealing the inner compartment being formed at least in part from an end of the impermeable elastic sleeve by securing the end of the impermeable elastic sleeve in a recess formed in the end section of the outer tubular body such that when the outer and inner compartments of the tube pressure filter contain, respectively, a hydraulic fluid under pressure and a wet particulate solid material to be pressure filtered, the impermeable elastic sleeve is urged inwards by the hydraulic fluid against the surface of the adjacent end section of the inner tubular body to form a seal therewith, and wherein in the rest condition of the impermeable elastic sleeve the upper and lower ends of the impermeable elastic sleeve extend inwardly from their respective recesses to engage their respective end sections.

5. A tube pressure filter as claimed in claim 4, wherein said recess also contains a flexible annular member.

6. A tube pressure filter as claimed in claim 4, wherein said outer compartment inlet for hydraulic fluid is in the form of an annular slot extending around the outer periphery of the outer compartment and located across from the portion of the impermeable elastic sleeve which engages the end section such that the hydraulic fluid enters the outer compartment at the portion of the impermeable elastic sleeve engaging the end section.

7. A tube pressure filter according to claim 6, including two of said annular slots, one at each end of the outer compartment.

8. A tube pressure filter according to claim 4, wherein the portion of the impermeable elastic sleeve engaging the end section engages the fairing portion thereof.

* * * * *